No. 863,827. PATENTED AUG. 20, 1907.
J. ALLOATTI.
VEHICLE WHEEL.
APPLICATION FILED JAN. 19, 1906.

2 SHEETS—SHEET 1.

Witnesses:

Joseph Alloatti,
Inventor

By Marion & Marion
Attorneys

No. 863,827. PATENTED AUG. 20, 1907.
J. ALLOATTI.
VEHICLE WHEEL.
APPLICATION FILED JAN. 19, 1906.

2 SHEETS—SHEET 2.

Witnesses:

Joseph Alloatti,
Inventor

By Marion & Marion
Attorneys

UNITED STATES PATENT OFFICE.

JOSEPH ALLOATTI, OF GERZAT, FRANCE.

VEHICLE-WHEEL.

No. 863,827.     Specification of Letters Patent.     Patented Aug. 20, 1907.

Application filed January 19, 1906. Serial No. 296,840½.

*To all whom it may concern:*

Be it known that I, JOSEPH ALLOATTI, a citizen of France, residing at Gerzat, in the Department of Puy-de-Dôme, France, have invented new and useful Improvements in and Connected with Vehicle-Wheels, (for which I have obtained a patent in Belgium No. 182,231, bearing date February 2, 1905,) of which the following is a specification.

This invention has for its object a vehicle wheel having great adhesion which property is obtained by the employment of a tire formed by the provision of a large number of independent elastic elements, several of which rest simultaneously on the ground under the action of the weight of the vehicle, thus constituting a frictional surface the value of which, which depends on the elasticity or resiliency of the parts in question, may be calculated to suit the requirements of the case in order to prevent the side slip of the wheels.

The invention is shown as an example in the accompanying drawings, in which:—

Figure 1:
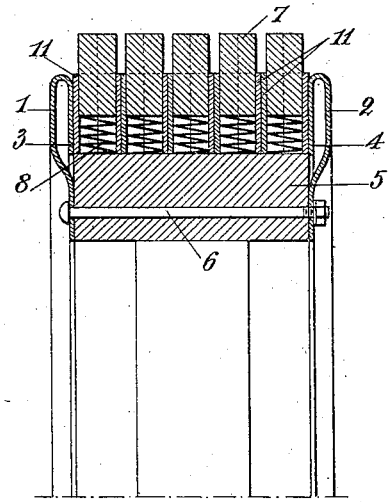
Figure 2:
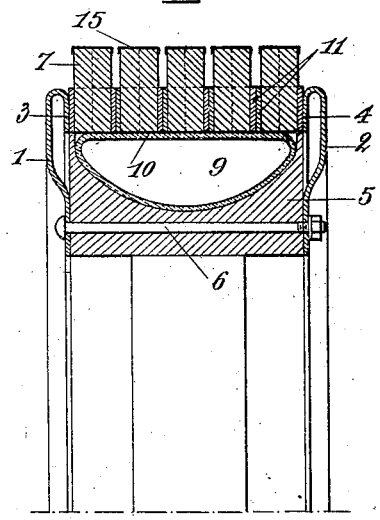
Figure 3:
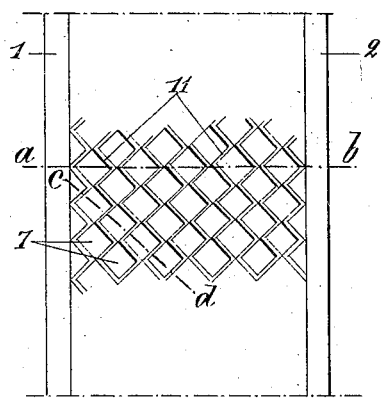
Figure 4:
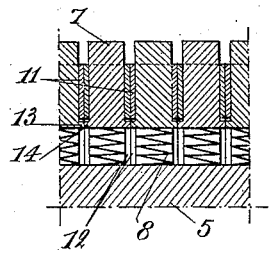
Figure 5:
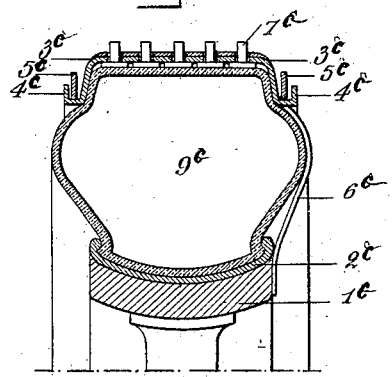
Figure 6:
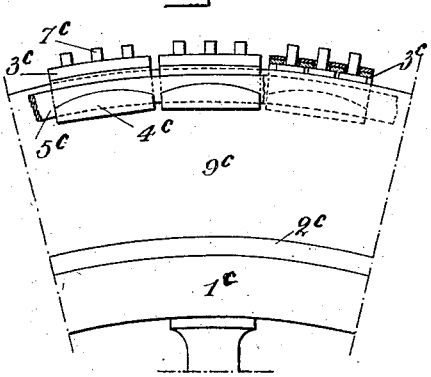
Figure 7:
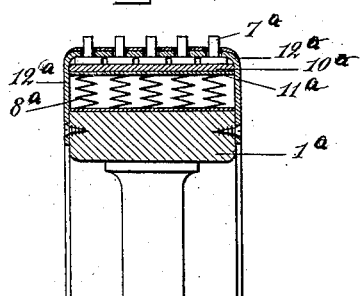
Figure 8:
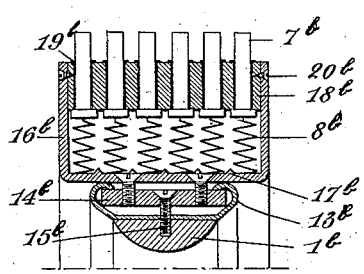
Figure 9:
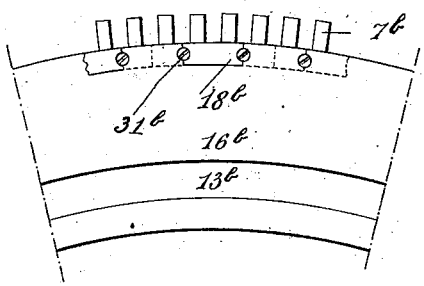

Figure 1 is a view in transverse section, on the line $a$—$b$ of Fig. 3, of a portion of a wheel constructed according to the present invention; Fig. 2, a view in transverse section of a modification of said wheel; Fig. 3, a plan view of a portion of the wheel shown in Fig. 1; Fig. 4, an elevation and transverse section made on the line $c$—$d$ of Fig. 3 of a portion of the wheel shown in Figs. 1 and 3; Fig. 5, a view in transverse section of a modification of the wheel rim and tire of the type shown in Fig. 2; Fig. 6, a view in elevation and partial longitudinal section of the same felly; Fig. 7, a view in transverse section of a modification of a wheel rim and tire of the type represented in Fig. 1; Fig. 8, a plan view in transverse section of another modification of the wheel rim and tire arranged on the same principle; Fig. 9, a view in longitudinal elevation of the same modification; and Fig. 10, a plan view of one of the parts constituting the metallic cover or cap of this tire.

Now referring to Figs. 1, 2, 3 and 4 it will be seen that the improved form of wheel shown comprises a rim formed by two annular cheeks 1 and 2, forming a spring owing to their bent back edges 3, 4; these parts are fixed on the rim proper 5 by means of bolts such as 6 or in any other suitable manner.

The tread or running surface of the wheel is formed of blocks or pistons 7 movable in the direction of the spokes of the wheel, the lower ends of which blocks rest on an elastic bed formed either of springs such as 8 (Fig. 1) or of a pneumatic cushion or lining such as 9 (Fig. 2), having a suitable section for this purpose, and adapted to be provided with a protective lining 10 on which the blocks or pistons 7 directly rest. The guiding and support of the said blocks or pistons are obtained in the following manner:—

The blocks or pistons 7 (Fig. 3) are arranged in rows between which are interpolated grooved strips, such as 11 having a suitable form resembling that of a zigzag collarette, and held in position on the rim proper by the pressure that the spring cheeks 1, 2, exercise on the whole. When the parts are supported by springs 8 (Figs. 1 and 4) the strips 11 are provided with notches 12 forming grooves, into which two little spurs or studs 13, 14, arranged on the lower part of the blocks or pistons 7 and forming a stop for limiting the displacement of said blocks or pistons engage. The lower part of the strips 11 in which the grooves 12 are formed, form also the chambers necessary for the housing of the springs 8.

When the blocks or pistons 7 rest on a pneumatic cushion (Fig. 2), the lower part aforesaid of the strips 11 are no longer required, and the studs or spurs 13, 14, and the grooves 12 may be advantageously replaced by a retaining hoop 15 of suitable flexible material surrounding each ring of blocks or pistons 7 to which it is suitably attached; naturally this system of holding the blocks or pistons 7 might also be employed in the cases where these latter rest on springs 8.

In the modification shown in Figs. 5 and 6 the tire is always formed of a pneumatic cushion $9^c$ attached to the wheel $1^c$ by means of a metallic rim $2^c$ of the ordinary known type. On the pneumatic cushion $9^c$ are placed soles or metallic strips $3^c$ bent back at each of their ends $4^c$ to receive two rings $5^c$ which serve to maintain them in place on the pneumatic cushion. These strips or soles are provided with perforations into which the blocks or pistons $7^c$ pass, on the external face of which the wheel runs and the interior base of which is flattened in order to have a better support on the pneumatic cushion. Side supports $6^c$ screwed on the one hand to the strips or soles $3^c$ and connected on the other hand by screwing or otherwise to felly of the wheel $1^c$, serve for retaining these strips or soles in case of an accidental deflation of the pneumatic cushion. The strips or soles $3^c$ instead of being formed of separate elements may be made in one piece, jointed so as to bear on the whole pneumatic cushion of the wheel, nevertheless in this case the side hooks $6^c$ are retained.

In the modification shown in Fig. 7 the pneumatic cushion is, as in Fig. 1, replaced by springs $8^a$ which may be of any suitable type and form, above which are placed a metallic strip $11^a$, and a strip of india-rubber or leather $10^a$ serving to better distribute their pressure. The blocks or pistons $7^a$ are then placed on the strip $10^a$ and protrude through orifices formed in the top of a metallic cap $12^a$ which forms a box in which all the springs are located. This box may either be simply screwed to the felly of the wheel 1ª, or attached to the latter by means of an arrangement of hooks and rings analogous to the one hereinbefore described.

Figure 10:
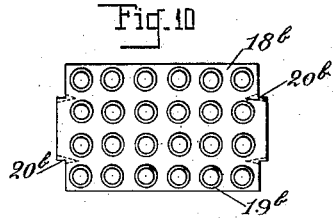

In the arrangement shown in Figs. 8, 9 and 10 in which springs are also used, the construction is as follows:—A certain number (about 12) of transverse pieces 14ᵇ are arranged in a metallic rim 13ᵇ similar to the rims of cycles and auto-cars, which transverse pieces are placed in position by being introduced first longitudinally and then turned transversely, after which they are screwed to the rim as shown at 15ᵇ. An annular metallic box 16ᵇ forming the rim proper of the wheel, is then screwed to these transverse pieces 14ᵇ thus attached, and in this box, suitably divided at its base by projecting points 17ᵇ, the parts formed respectively of a block or piston 7ᵇ and spring 8ᵇ, at the rear of said piston. The box is closed by a series of elements forming a lid 20ᵇ, each constituted of a sheet of steel provided with rings 19ᵇ, into which the blocks or pistons 7ᵇ fit which are thus guided and held. The parts of the lid are secured to the edge of the box by means of the screws 31ᵇ, as shown in Figs. 8 and 9.

Under these conditions of arrangement it is obvious that it is possible to make a wheel, the traveling surface of which is formed of a large number of independent resilient or elastic elements adapted to come in contact with the ground in order that the wheel may adapt itself to all the unevennesses, in particular in the direction of the width of the wheel, preventing side slipping without the surface of the wheel in contact with the ground being exaggerated in the direction of the circumference of the wheel, assuming that the various transverse rows of elastic parts are independent, and that the elements which constitute them are movable in the direction of the spokes of the wheel, that is to say without influencing the elements forming the adjacent rows. These arrangements thus enable the driving force to be reduced without diminishing the anti-side-slipping properties of the arrangement.

I declare that what I claim is:—

1. In a vehicle wheel, a series of movable pistons arranged in rows transverse to the perimeter of said wheel and forming the tread thereof, means for guiding said pistons, spring means for retaining said guiding means, and elastic means arranged to receive the thrust of said pistons.

2. In a vehicle wheel, a series of movable pistons arranged in rows transverse to the perimeter of said wheel and forming the tread thereof, means for guiding said pistons, consisting of a series of grooved strips, spring cheeks attached to the wheel for retaining said grooved strips, and elastic means arranged to receive the thrusts of said pistons.

3. In a vehicle wheel, a series of movable pistons arranged in rows transverse to the perimeter of said wheel and forming the tread thereof, means for guiding said pistons consisting of a series of grooved strips, a felly, an annular metallic strip secured to the opposite edges of said felly, said strip being bent back to form spring retaining means for the guide members, and elastic means arranged to receive the thrusts of said pistons.

In testimony whereof I have signed my name to this specification in the presence of two subscribing witnesses.

JOSEPH ALLOATTI.

Witnesses:
  JULES FAYOLLET,
  EUGÈNE PICHON.